(12) United States Patent
Kim et al.

(10) Patent No.: US 12,734,993 B2
(45) Date of Patent: Sep. 15, 2026

(54) CONSTRUCTION MACHINE AND USER LOGIN METHOD USING SAME

(71) Applicant: HD Construction Equipment Co., Ltd., Seongnam-si (KR)

(72) Inventors: Yoon Hye Kim, Dong-gu (KR); Han Sol Kim, Dong-gu (KR); Wook Hyun Yu, Dong-gu (KR)

(73) Assignee: HD CONSTRUCTION EQUIPMENT CO., LTD., Seongnam-si (KR)

( * ) Notice: Subject to any disclaimer, the term of this patent is extended or adjusted under 35 U.S.C. 154(b) by 0 days.

(21) Appl. No.: 18/837,682

(22) PCT Filed: Feb. 10, 2023

(86) PCT No.: PCT/KR2023/001988

§ 371 (c)(1),
(2) Date: Aug. 12, 2024

(87) PCT Pub. No.: WO2023/158167

PCT Pub. Date: Aug. 24, 2023

(65) Prior Publication Data

US 2025/0153681 A1 May 15, 2025

(30) Foreign Application Priority Data

Feb. 18, 2022 (KR) ........................ 10-2022-0021153

(51) Int. Cl.
*B60R 25/24* (2013.01)
*B60K 35/10* (2024.01)
(Continued)

(52) U.S. Cl.
CPC .............. *B60R 25/24* (2013.01); *B60K 35/10* (2024.01); *B60K 35/21* (2024.01); *B60K 35/26* (2024.01);
(Continued)

(58) Field of Classification Search
None
See application file for complete search history.

(56) References Cited

U.S. PATENT DOCUMENTS 8,768,565 B2 * 7/2014 Jefferies ............... G07C 5/0808 701/32.7
8,995,981 B1 * 3/2015 Aginsky ........... H04M 1/72415 455/419
(Continued)

FOREIGN PATENT DOCUMENTS

JP 2013241103 A 12/2013
JP 2017043203 A 3/2017
(Continued)

OTHER PUBLICATIONS

International Search Report for related International Application No. PCT/KR2023/001988; action dated Aug. 24, 2023; (5 pages).
(Continued)

*Primary Examiner* — Carlos Garcia
(74) *Attorney, Agent, or Firm* — K&L Gates LLP

(57) ABSTRACT

A construction machine according to embodiments of the present disclosure may include a manipulation device configured to receive a command or data used to control an operation of a construction machine, an output device configured to generate at least one of visual information, auditory information, and tactile information related to the operation of the construction machine, a user login device configured to identify a user as a public user, a previous user, or a specific user according to a selected login method and set the construction machine based on the identified user, a processor configured to control at least one of the user login device, a storage device, a manipulation device, and an output device, and a storage device configured to store data
(Continued)

used by the manipulation device, the output device, the user login device, and the processor.

12 Claims, 4 Drawing Sheets

(51) Int. Cl.

| | |
|---|---|
| ***B60K 35/21*** | (2024.01) |
| ***B60K 35/25*** | (2024.01) |
| ***B60K 35/26*** | (2024.01) |
| ***B60K 35/50*** | (2024.01) |
| ***B60K 35/60*** | (2024.01) |
| ***B60K 35/90*** | (2024.01) |
| ***B60R 25/04*** | (2013.01) |
| ***B60R 25/23*** | (2013.01) |
| ***E02F 9/20*** | (2006.01) |
| ***E02F 9/26*** | (2006.01) |
| ***G07C 9/00*** | (2020.01) |

(52) U.S. Cl.
CPC .............. *B60K 35/50* (2024.01); *B60K 35/60* (2024.01); *B60K 35/90* (2024.01); *B60R 25/04* (2013.01); *B60R 25/23* (2013.01); *E02F 9/2025* (2013.01); *E02F 9/26* (2013.01); *G07C 9/00309* (2013.01); *B60K 35/25* (2024.01); *B60R 2325/308* (2013.01); *G07C 2009/00793* (2013.01); *G07C 2209/08* (2013.01)

(56) References Cited

U.S. PATENT DOCUMENTS

| | | | | |
|---|---|---|---|---|
| 11,472,372 | B2 * | 10/2022 | Kim | E02F 9/26 |
| 11,544,627 | B1 * | 1/2023 | Bryce | G06Q 40/03 |
| 12,221,066 | B2 * | 2/2025 | Asai | B60R 25/245 |
| 2002/0083347 | A1 * | 6/2002 | Taguchi | G06F 21/36 726/5 |
| 2005/0240987 | A1 * | 10/2005 | Taguchi | G06F 21/31 726/1 |
| 2013/0116892 | A1 * | 5/2013 | Wu | B60R 25/09 701/45 |
| 2017/0240181 | A1 * | 8/2017 | Yu | B60R 25/00 |
| 2020/0186590 | A1 | 6/2020 | Penilla et al. | |
| 2020/0290565 | A1 * | 9/2020 | Kim | G07C 9/00309 |
| 2022/0271810 | A1 * | 8/2022 | Loghin | H04B 7/0695 |

FOREIGN PATENT DOCUMENTS

| | | | |
|---|---|---|---|
| JP | 2021151836 | A | 9/2021 |
| KR | 20200109182 | A | 9/2020 |
| WO | 2021023830 | A1 | 2/2021 |

OTHER PUBLICATIONS

Written Opinion for related International Application No. PCT/KR2023/001988; action dated Aug. 24, 2023; (4 pages).

Office Action for related Korean Application No. 10-2022-0021153; action dated Apr. 25, 2026; (9 pages).

* cited by examiner

CONSTRUCTION MACHINE AND USER LOGIN METHOD USING SAME

CROSS-REFERENCE TO RELATED APPLICATIONS

This application is the National Stage filing under 35 U.S.C. 371 of International Application No. PCT/KR2023/001988, filed Feb. 10, 2023 which claims the benefit of earlier filing date and right of priority to Korean Application No. 10-2022-0021153, filed on Feb. 18, 2022, the contents of which are all hereby incorporated by reference herein in their entirety.

FIELD

Various embodiments of the present disclosure relate to a construction machine capable of logging in based on a smart key and a user logging method using the same.

BACKGROUND

Equipment for earthmoving work at construction sites has been continuously improved and developed. Construction machines used at the construction site are designed so that an expert as a user may perform work by boarding the construction machines and directly operating the same.

In general, unlike private vehicles, the construction machines have different owners and users in many cases, and multiple construction machines may be shared by multiple users, and thus each user should change a setting state of the construction machine each time he/she works on the construction machine.

As functions of the construction machines become more complex and options thereof become more diverse, the number of items that users need to set is also increasing, and the time users spend changing the setting state of the construction machine is increasing.

Moreover, there is a difficulty in that the user of the construction machine should turn off the engine of the construction machine and re-set the construction machine to re-start work after leaving the construction machine for a while.

SUMMARY

When a user of a construction machine re-manipulates the construction machine within a set time, there is a need for a user login device and login method that may maintain a previous user's settings and apply the same to the construction machine.

The present disclosure is directed to determining that a user is a previous user when an engine is re-started using a smart key within a set time after the engine is started using the smart key and applying the previous user's setting information and equipment operation information to a construction machine.

To achieve the object, the present disclosure has embodiments having the following characteristics.

A construction machine according to an embodiment may include a manipulation device configured to receive a command or data used to control an operation of a construction machine, an output device configured to generate at least one of visual information, auditory information, and tactile information related to the operation of the construction machine, a user login device configured to identify a current user of the construction machine as any one of a public user, a previous user, or a specific user according to whether to activate a start lock function, whether to recognize at least one smart key within a lock suspension time, and whether the recognized at least one smart key matches a previous user's smart key, and apply the identified user's settings to the construction machine, a processor configured to control at least one of the user login device, a storage device, a manipulation device, and an output device, and a storage device configured to store data used by the manipulation device, the output device, the user login device, and the processor.

The user login device may identify the current user of the construction machine as the previous user when the same smart key as the previous user's smart key is recognized within the lock suspension time after the construction machine is turned off in a state in which the start lock function is activated.

The user login device may identify the current user of the construction machine as the public user when at least one smart key recognized within the lock suspension time after the construction machine is turned off in a state in which the start lock function is activated is not the previous user's smart key, or when the at least one smart key is recognized after the lock suspension time is exceeded after the construction machine is turned off in the state in which the start lock function is activated.

The user login device may identify the current user of the construction machine as a public user when the at least one smart key is recognized in a state in which the start lock function is deactivated.

The user login device may maintain the previous user's settings and operation information when the current user of the construction machine is identified as the previous user.

The user login device may initialize the previous user's settings and the operation information when the current user of the construction machine is identified as the public user.

The user login device may apply the specific user's settings and operation information that correspond to a password input by the specific user when the current user of the construction machine is identified as the specific user.

A construction machine according to another embodiment may include at least one smart key interworking with a construction machine, a start lock device configured to set a lock suspension time based on an input of a previous user of the construction machine, and a user login device configured to identify a current user of the construction machine as any one of a public user, a previous user, or a specific user according to whether to activate a start lock device, whether to recognize at least one smart key within the lock suspension time, and whether the recognized at least one smart key matches the previous user's smart key, and apply the identified user's settings to the construction machine.

A user login method according to an embodiment may include identifying a current user of a construction machine as any one of a public user, a previous user, or a specific user according to whether to activate a start lock function, whether to recognize at least one smart key within a lock suspension time, and whether the recognized at least smart key matches a previous user's smart key, and setting the construction machine based on the identified user.

The identifying the current user of the construction machine may include identifying the current user of the construction machine as the previous user when the same smart key as the previous user's smart key is recognized within the lock suspension time after the construction machine is turned off in a state in which the start lock function is activated.

The setting the construction machine may include setting the construction machine to maintain the previous user's settings and operation information when the current user of the construction machine is identified as the previous user.

The identifying the current user of the construction machine may include identifying the current user of the construction machine as the public user when the at least one smart key is recognized in a state in which the start lock function is deactivated or a smart key different from the previous user's smart key is recognized in a state in which the start lock function is activated.

The setting the construction machine may include setting the construction machine to initialize the previous user's settings and operation information when the current user of the construction machine is identified as the public user.

The setting the construction machine may include setting the construction machine to change the settings and operation information of the construction machine into settings and operation information that correspond to a password input by the specific user when the current user of the construction machine is identified as the specific user.

According to the present disclosure, in the case where the lock suspension function is set, by maintaining the user's setting information and equipment operation information even when the engine is turned off, determining that the user is the previous user when the user logs in using the smart key within the set time, and applying the user's maintained setting information and equipment operation information to the construction machine, it is possible to increase the user's convenience.

DETAILED DESCRIPTION

Figure 1:
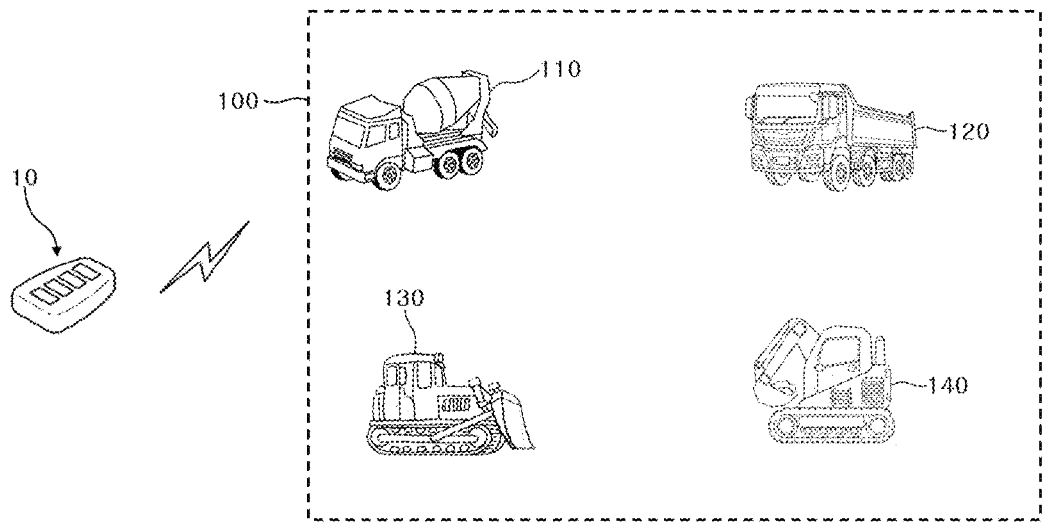
FIG. 1 is a view showing a construction machine according to various embodiments of the present disclosure.

Advantages and features of the present disclosure and an apparatus and method for achieving them will become clear with reference to embodiments described below in detail in conjunction with the accompanying drawings. However, the present disclosure is not limited to the embodiments disclosed below but can be implemented in various different forms, these embodiments are merely provided to make the disclosure of the present disclosure complete and fully inform those skilled in the art to which the present disclosure pertains of the scope of the present disclosure, and the present disclosure is only defined by the scope of the appended claims. The same reference number denotes the same components throughout the specification.

When a first component is "connected to" or "coupled to" a second component, it includes both a case in which the first component is directly connected or coupled to the second component or a case in which other components are interposed therebetween. On the other hand, when the first component is "directly connected to" or "directly coupled to" the second component, it means that other components are not interposed therebetween. The term "and/or" includes each of stated items and any combination of one or more.

Terms used herein are intended to describe the embodiments and are not intended to limit the present disclosure. In the present specification, the singular form also includes the plural form unless specifically stated in the phrase. As used herein, "comprises" and/or "comprising" means that the stated component, step, operation, and/or element do not preclude the presence of addition of one or more other components, steps, operations, and/or elements.

Although first, second, and the like are used to describe various components, it goes without saying that these components are not limited by these terms. These terms are only used to distinguish one component from another component.

Therefore, it goes without saying that a first component to be described below may be a second component within the technical spirit of the present disclosure. Unless otherwise defined, all terms (including technical and scientific terms) used in the specification may be used as meaning commonly understood by those skilled in the art to which the present disclosure pertains. In addition, terms defined in commonly used dictionaries are not construed ideally or excessively unless clearly and specially defined.

The term "unit" or "module" used herein is software or a hardware component such as a field programmable gate array (FPGA) or an application specific integrated circuit (ASIC), and the "unit" or "module" performs certain functions. However, the "unit" or "module" is not limited to software or hardware. The "unit" or "module" may be configured to be disposed in an addressable storage medium and configured to play one or more processors. Therefore, as an example, the "unit" or "module" is components such as software components, object-oriented software components, class components, and task components, processes, functions, properties, procedures, subroutines, segments of program code, drivers, firmware, microcode, circuitry, data, databases, data structures, tables, arrays, and variables. Functions provided in components and "units" or "modules" may be combined into the smaller number of components and "unit" or "modules" or separated into additional components and "units" or "modules."

Operations of a method or algorithm described in connection with some embodiments of the present disclosure may be implemented directly in hardware and software modules executed by a processor or a combination of the two. The software modules may reside in a RAM memory, a flash memory, a ROM memory, an EPROM memory, an EEPROM memory, a register, a hard disk, a removable disk, a CD-ROM, or any other form of recording medium known in the art. An exemplary recording medium is coupled to a processor, and the processor may read information from the recording medium and write the information to the storage medium. As another method, the recording medium may be integrated with the processor. The processor and the recording medium may reside in an ASIC. The ASIC may reside in a user terminal.

FIG. 1 is a view showing a construction machine according to various embodiments of the present disclosure.

According to various embodiments, a construction machine 100 is a machine for performing work at civil engineering or building construction sites and as shown in FIG. 1, may include a mixer truck 110, a dump truck 120, a dozer 130, and an excavator 140. However, this is only illustrative, and the construction machine may include various machines such as drilling machines, cranes, wheel loaders, and scrapers. These construction machines may perform work based on a user's manipulation or perform autonomous work without the user. The autonomous work may include all operations in which the construction machine 100 moves autonomously without the user's manipulation, autonomously performs work that may be performed by the construction machine 100, etc.

According to one embodiment, the construction machine 100 may include a machine for performing work at civil engineering or building construction sites using fossil fuel or electrical energy as a power source.

For example, the excavator 140 that uses fossil fuels rotates an engine using oil, drives a hydraulic pump using the power of the engine, and supplies a hydraulic fluid discharged from the hydraulic pump to a hydraulic actuator such as a hydraulic motor or a hydraulic cylinder to rotate a crawler or tire for traveling or each work part of a boom, an arm, a bucket, etc.

For example, the excavator 140 that uses electrical energy as a power source is provided with an electric motor rotated using the electrical energy as power, drives a hydraulic pump using the power of the electric motor, and supplies a hydraulic fluid discharged from the hydraulic pump to a hydraulic actuator such as a hydraulic motor or a hydraulic cylinder to rotate a crawler or tire for traveling or each work part of a boom, an arm, a bucket, etc.

When a user carries a smart key 10 and approaches the construction machine 100, a door lock device in a locked state may be unlocked, and when the user carries the smart key 10 and boards the construction machine 100, the user may start the construction machine 100.

Figure 2:
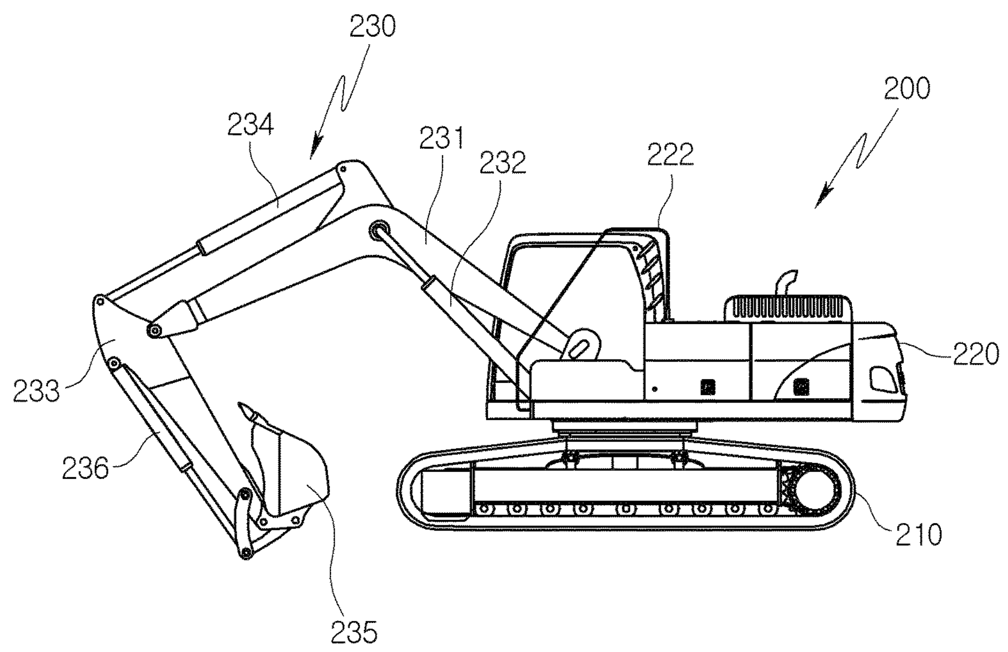
FIGS. 2 and 3 are views for describing an excavator according to various embodiments of the present disclosure.
Figure 3:
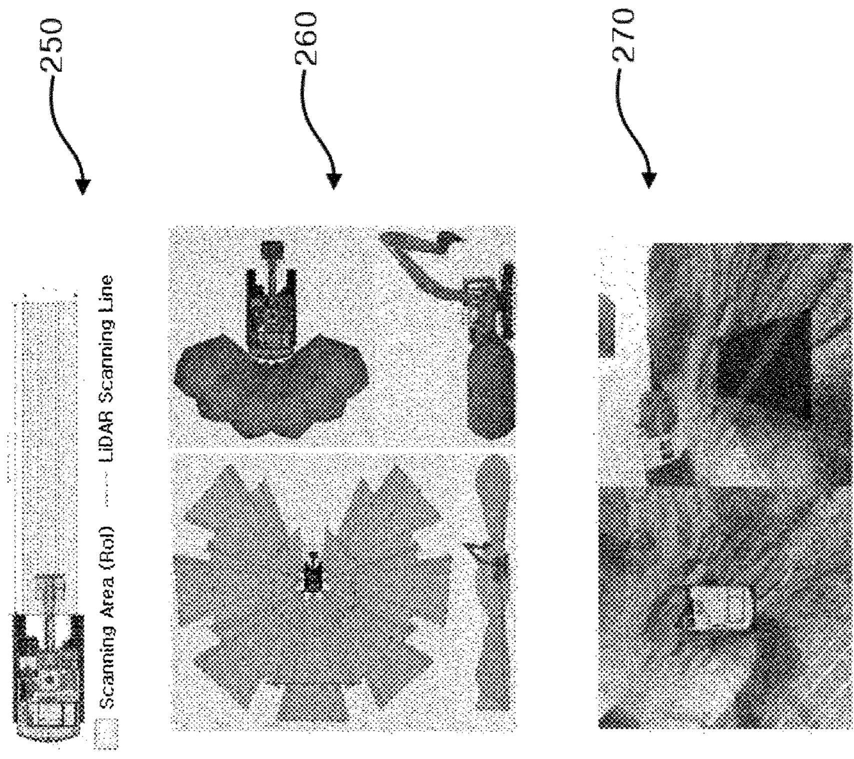
Figure 3:
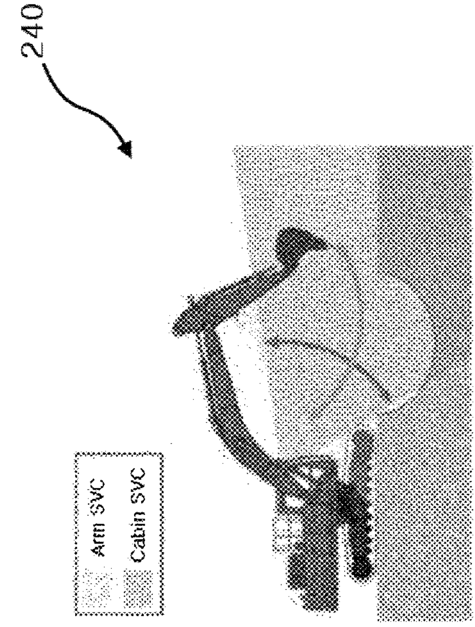

FIGS. 2 and 3 are views for describing an excavator according to various embodiments of the present disclosure. In the following description, the excavator among the construction machines shown in FIG. 1 will be described as an example, but the construction machine is not limited to the excavator.

Referring to FIG. 2, an excavator 200 may include a lower body 210 for movement, an upper body 220 mounted on the lower body 210 to rotates 360 degrees, and a front work device 230 coupled to the front of the upper body 220. However, this is only illustrative, and the embodiments of the present disclosure are not limited thereto. For example, in addition to the above-described components of the excavator 200, one or more other components (e.g., a plate coupled to the rear of the lower body 210) may be added.

According to various embodiments, the upper body 220 may have a cab 222 that a driver may board and manipulate embedded therein and may be provided with an internal space (not shown) in which a power generator (e.g., an electric motor) may be mounted. The cab 222 may be provided close to a work area. The work area is a space in which the excavator 200 works and may be located in front of the excavator 200. For example, in consideration of the fact that the driver on board performs work under a secured field of view and a location at which the front work device 230 is mounted, the cab 222 may be close to the work area as shown in FIG. 2 and located at a location biased to one side from the upper body 220.

According to various embodiments, the front work device 230 may be a device mounted on an upper surface of the upper body 220 to perform work such as excavating land or transporting objects with a large load. According to one embodiment, the front work device 230 may include a boom 231 rotatably coupled to the upper body 220, a boom cylinder 232 for rotating the boom 231, an arm 233 rotatably coupled to a front end of the boom 231, an arm cylinder 234 for rotating the arm 233, a bucket 235 rotatably coupled to the front end of the arm 233, and a bucket cylinder 236 for rotating the bucket 235. While the excavator 200 works, one end of the boom 231, one end of the arm 233, and one end of the bucket 235 may each individually rotate, thereby maximizing an area in which the bucket 235 may reach. Since the front work device 230 is known in many documents, detailed description thereof will be omitted.

According to various embodiments, the lower body 210 may be coupled to a lower surface of the upper body 220. The lower body 210 may include a traveling body formed of a wheel type using wheels or a crawler type using a caterpillar. The traveling body may implement the omni-directional movements of the excavator using power generated by the power generator as a driving force. According to one embodiment, the lower body 210 and the upper body 220 may be rotatably coupled by a center joint.

FIG. 3 is a view for describing sensors provided in the excavator 200.

According to various embodiments, the excavator 200 may perform unmanned automation, that is, autonomous work, and include a plurality of sensors.

According to one embodiment, the plurality of sensors may include a first sensor for detecting a state of the excavator 200. For example, the state of the excavator 200 may include a rotation state of the upper body 220 (or the lower body 210). The first sensor may be disposed at the center joint to detect the rotation state of the upper body 220. In addition, the state of the excavator 200 may include a rotation state of the front work device 230. The first sensor may be disposed on each of the boom 231, the arm 233, and the bucket 235 or at joints (e.g., hinge connection portions) of the boom 231, the arm 233, and the bucket 235 to at least detect a rotation state of each of the boom 231, the arm 233, and the bucket 235. A location of the above-described first sensor is one embodiment, and the present disclosure is not limited thereto, and the first sensor may be disposed at various locations at which the state of the excavator 200 may be detected.

According to one embodiment, the plurality of sensors may include a second sensor for detecting a work area in which the excavator 200 works. As described above, the work area is a space in which the excavator works and may be located in front of the excavator 200. The second sensor may be disposed on a portion of the upper body 220 close to the work area, for example, at one side of the upper surface of the cab 222 close to the front work device 230 to detect the work area. However, this is only illustrative, and the location of the second sensor is not limited thereto. For example, the second sensor may additionally or selectively be disposed on the front work device 230, for example, the arm 233 or the bucket 235 to detect the work area.

According to one embodiment, the plurality of sensors may include a third sensor for detecting obstacles near the excavator 200. The third sensor may be disposed at the front, side, and rear of the upper body 220 to detect obstacles near the excavator. The location of the above-described third sensor is one embodiment, and the present disclosure is not limited thereto, and the third sensor may be disposed at various locations at which the obstacles near the excavator 200 may be detected.

According to various embodiments, various sensors described above may include an angle sensor, an inertial measurement unit (IMU) sensor, a rotation sensor, a swing sensor, an electromagnetic wave sensor, a camera sensor, a radar, a LiDAR, an ultrasonic sensor, etc. For example, the first sensor may include at least one of the angle sensor, the inertial sensor, the rotation sensor, and the swing sensor, and the second and third sensors may include at least one of the electromagnetic wave sensor, the camera sensor, the radar, the LiDAR, and the ultrasonic sensor. For example, as shown in FIG. 3, a camera sensor 240 disposed on the upper surface of the cab 222 and the arm 233 of the excavator 200 may be used as the second sensor. In addition, as shown in FIG. 3, a LiDAR 250 disposed on a front surface of the excavator 200, ultrasonic sensors 260 disposed on side and rear surfaces of the excavator 200, or camera sensors 270 disposed on the front, side, and rear surfaces of the excavator 200 may be used as the third sensor. Additionally or selectively, when an image sensor is used as the second sensor or the third sensor, the image senor may be configured as a stereo vision system capable of acquiring an image showing distance information of an object.

In addition, each of the first sensor, the second sensor, and the third sensor may perform operations that are the same as or similar to other sensors. For example, the third sensor for detecting obstacles near the excavator 200 may be used to perform the operation of the second sensor for detecting the work area in which the excavator 200 works.

According to various embodiments, the excavator 200 may perform unmanned automation, that is, autonomous work and include at least one positioning device or acquire positioning information from an external device.

According to one embodiment, as the positioning device, a global navigation satellite system (GNSS) module capable of receiving satellite signals may be used, and a real time kinematic (RTK) GNSS module may be used for precise measurement. For example, at least one positioning device may be disposed on the upper body 220 of the excavator 200. In addition, when the RTK GNSS module is used, the excavator 200 may receive a correction signal from at least one base station for precise location measurement near the excavator 200.

Figure 4:
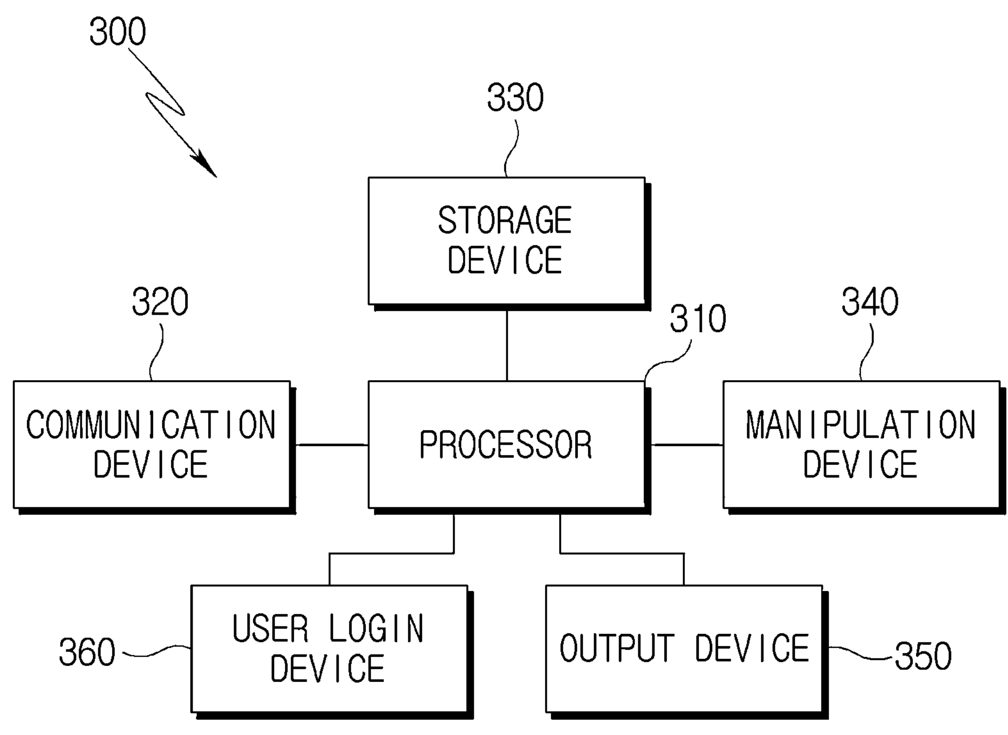
FIG. 4 is a conceptual diagram of the excavator according to various embodiments of the present disclosure.

FIG. 4 is a conceptual diagram of the excavator according to various embodiments of the present disclosure.

In the following description, FIG. 4 may be described based on an excavator as one example of a construction machine 300, but the present disclosure is not limited to the excavator.

Referring to FIG. 4, the construction machine, for example, the excavator 300 may include a processor 310, a communication device 320, a storage device 330, a manipulation device 340, an output device 350, and a user login device 360. However, this is only illustrative, and the embodiments of the present disclosure are not limited thereto. For example, at least one of the above-described components of the construction machine 300 may be omitted, or one or more other components (e.g., an input device) may be added as components of the construction machine 300.

According to various embodiments, the communication device 320 may transmit and receive data to and from an external device using a wireless communication technology. The external device may include a control center (not shown) and other construction machines 110 to 130. For example, the communication device 320 may receive work instructions from the external device and transmit information (e.g., work results) about the work to the external device. In this case, communication technologies used by the communication device 320 include Global System for Mobile communication (GSM), Code Division Multi Access (CDMA), Long Term Evolution (LTE), 5G, Wireless LAN (WLAN), and Wireless-Fidelity (Wi-Fi), Bluetooth, Radio Frequency Identification (RFID), Infrared Data Association (IrDA), ZigBee, Near Field Communication (NFC), etc. In addition, the communication device 320 may include at least one positioning device as described above with reference to FIG. 3.

In addition, the communication device 320 may include a smart key module capable of communicating with the smart key 10 in a wireless manner.

The smart key module may receive a signal generated according to the manipulation of a button provided on the smart key 10.

For example, when a user presses a lock button on the smart key 10, the smart key module receives a signal generated from the smart key 10, and thus a car door of the construction machine 100 may be switched to a locked state.

In addition, when the user presses an unlock button on the smart key 10, the smart key module receives a signal generated from the smart key 10, and thus the car door of the construction machine 100 may be switched to an open state.

According to various embodiments, the storage device 330 may store various pieces of data used by at least one component (e.g., the processor 310, the communication device 320, the manipulation device 340, the output device 350, or the user login device 360) of the construction machine 300. According to one embodiment, the storage device 330 may store the specifications (e.g., model names, unique numbers, and basic specifications), map data, etc. of the construction machine 300. For example, the storage device 330 may include at least one of a non-volatile memory device and a volatile memory device. In addition, the storage device 330 may store setting information of the construction machine 100 set for each user, equipment operation information (including a work time, fuel usage, etc.), and a password for each user.

According to various embodiments, a sensor device (not shown) my collect information about at least one of the state of the construction machine 300, the work area of the construction machine 300, or obstacles near the construction machine 300 using various sensors. As described above with reference to FIG. 3, the sensor device may include the first sensor, the second sensor, and the third sensor. For example, at least one of an angle sensor, an inertial sensor, or a rotation sensor for collecting information about the state of the construction machine 300 may be used as a component of the sensor device, and at least one of an electromagnetic wave sensor, a camera sensor, a radar, a LiDAR, and an ultrasonic sensor for collecting information about the work area of the construction machine 300 and obstacles near the construction machine 300 may be used as a component of the sensor device. However, this is only illustrative, and the embodiments of the present disclosure are not limited thereto. For example, various types of sensors capable of collecting the information about the state of the construction machine 300, the work area of the construction machine 300, or the obstacles near the construction machine 300 may be used as components of the sensor device.

According to various embodiments, the manipulation device 340 may control an operation of the construction machine, for example, the excavator 300.

According to various embodiments, the manipulation device 340 may receive commands or data to be used to control the operation of the excavator 300. The manipulation device 340 may include a manipulation lever for manipulating at least some (e.g., the boom 231, the arm 233, and the bucket 235) of the front work device 230, a handle for manipulating the steering of the lower body 210, a transmission lever for manipulating a moving speed or front-rear directional traveling of the excavator 300, etc. According to one embodiment, the manipulation device 340 may be provided in the cab 222 described above with reference to FIG. 2.

According to various embodiments, the output device 350 may generate an output related to the operation of the excavator 300. According to one embodiment, the output device 350 may include a display for outputting visual information, an audio data output device for outputting auditory information, a haptic module for outputting tactile information, etc. For example, the display may include a liquid crystal display (LCD), a light emitting diode (LED) display, an organic light emitting diode (OLED) display, or a micro electromechanical system (MEMS) display, electronic paper, etc. In addition, the audio data output device may be included in the excavator 300 or may include at least one of a speaker, an earphone, an earset, or a headset connected to the excavator 300 in a wired or wireless manner.

When the output device 350 according to various embodiments of the present disclosure includes a touch-type display, the output device 350 may output visual information to the user or receive the user's touch information.

According to various embodiments, the processor 310 may be configured to control the overall operation of the construction machine 300. According to one embodiment, the processor 310 may execute software (e.g., a program) stored in the storage device 330 to control at least one component of components (e.g., the communication device 320, the storage device 330, the manipulation device 340, the output device 350, and the user login device 360) connected to the processor 310 and perform various data processing or calculations. For example, as at least some of the data processing or calculations, the processor 310 may store commands or pieces of data received from other components in the storage device 330, process the commands or pieces of data stored in storage device 330, and store the resulting data in the storage device 330. The processor 310 may include a main processor and an auxiliary processor that may be operated independently of or together with the main processor. According to one embodiment, the processor 310 may perform controller area network (CAN) communication with the above-described components (e.g., the communication device 320, the storage device 330, the manipulation device 340, the output device 350, or the user login device 360), but the present disclosure is not limited thereto.

According to various embodiments, the user login device 360 may provide a plurality of login methods and classify the user of the construction machine 100 into a public user, a previous user, and a specific user according to the login method selected among the plurality of login methods.

According to one embodiment, the user login device 360 may provide a login method using only the smart key 10 as a first login method and a login method using the smart key or a password as a second login method.

When the first login method is selected, the user login device 360 may identify the user of the construction machine 100 as a public user and a previous user according to whether to activate a start lock function, whether to match the smart key of the previous user, and whether to recognize the smart key within the lock suspension time.

For example, when the start lock function is deactivated, the user login device 360 may identify a user carrying the smart key 10 and boarding the construction machine 100 as a public user.

When the start lock function is activated, the user login device 360 may identify a user carrying the smart key 10 different from the smart key 10 of the previous user and boarding the construction machine 100 as a public user.

When the start lock function is activated, the user login device 360 may identify a boarding user as a public user when the user carrying the smart key 10 of the previous user re-boards the construction machine 100 within the lock suspension time.

Meanwhile, when the start lock function is activated, the user login device 360 may provide a login screen to the user when the user carrying the smart key 10 of the previous user boards the construction machine 100 after the lock suspension time is exceeded.

In this case, the user may select whether to use the start lock function of the user login device 360, and when the user sets the use of the start lock function, the start lock function may be activated, and when the user sets the nonuse of the start lock function, the start lock function may be deactivated. The user login device 360 whose start lock function has been activated may maintain the previous settings of the construction machine 100 for the lock suspension time, and the lock suspension time may also be set by the user. Meanwhile, the user login device 360 whose start lock function has been activated may initialize the settings of the construction machine 100 when the lock suspension time is exceeded.

When the second login method is selected, the user login device 360 may identify a user as a public user and a previous user in the same manner as the first login method when the user carries the smart key 10 and boards the construction machine 100.

For example, when the start lock function is deactivated, the user login device 360 may identify a user carrying the smart key 10 and boarding the construction machine 100 as a public user.

When the start lock function is activated, the user login device 360 may identify a user carrying the smart key 10 different from the smart key 10 of the previous user and boarding the construction machine 100 as a public user.

When the start lock function is activated, the user login device 360 may identify a boarding user as a public user when the user carrying the smart key 10 of the previous user re-boards the construction machine 100 within the lock suspension time.

Meanwhile, when the start lock function is activated, the user login device 360 may provide a login screen to the user when the user carrying the smart key 10 of the previous user boards the construction machine 100 after the lock suspension time is exceeded.

In addition, when the second login method is selected, the user login device 360 may provide a login screen to the user when the user boards the construction machine 100 without the smart key 10.

After the login screen is provided to the user, the user login device 360 may determine whether a password input by the user matches passwords stored in the storage device 330.

When the password input by the user matches one of the passwords stored in the storage device 330, the user login device 360 may identify the user inputting the password as a specific user.

Meanwhile, when the password input by the user does not match any of the passwords stored in the storage device 330, the user login device 360 may re-provide the login screen to the user.

In this case, the user login device 360 may count the number of times the user inputs the password, and when the counted number exceeds a preset number (e.g., 3 times), the user login device 360 may stop providing the login screen for a preset time (e.g., 10 minutes).

As described above, according to various embodiments, the user login device 360 may classify a user boarding the construction machine 100 into a public user, a previous user, and a specific user.

The user identified as one of the public user, the previous user, and the specific user may acquire start authority by the user login device 360, and the user who has acquired the start authority may start the construction machine 100 through the manipulation device 340.

When the user boarding the construction machine 100 is identified as a public user, the user login device 360 may change the settings of the construction machine 100 according to the public user's input.

When the user boarding the construction machine 100 is identified as a previous user, the user login device 360 may maintain the previous user's settings for the construction machine 100.

When the user boarding the construction machine 100 is identified as a specific user, the user login device 360 may change the settings of the construction machine 100 into the specific user's settings. In this case, the specific user's settings may be stored in the storage device 330, and the user login device 360 may receive setting information corresponding to the password input by the user from the storage device 330 and change the settings of the construction machine 100 into settings according to the received setting information.

As shown in FIG. 4, the user login device 360 may be implemented as a device controlled by the processor 310 in hardware and implemented to be included in the processor 310 as a program or algorithm in software.

Figure 5:
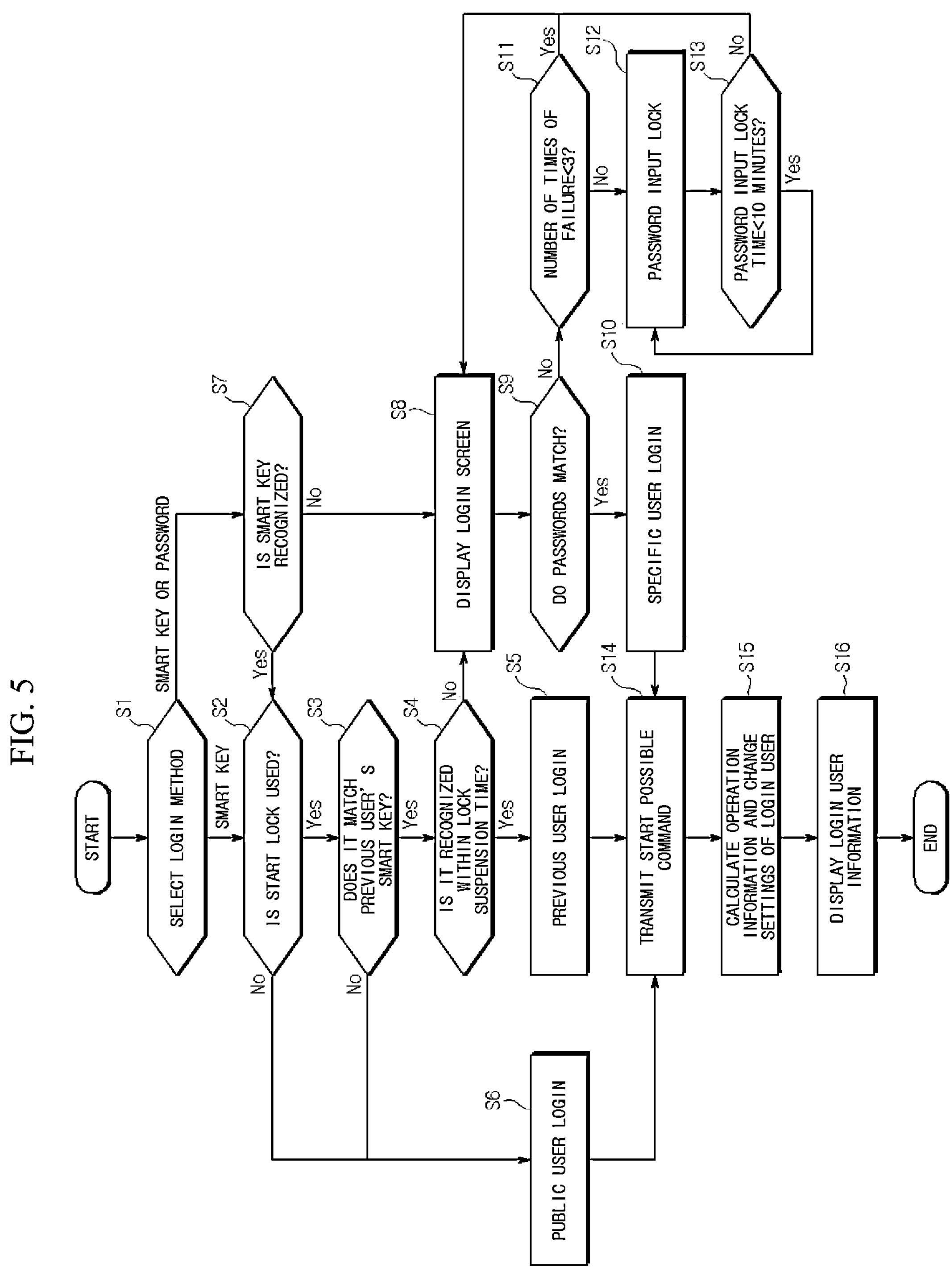
FIG. 5 is a flowchart showing a login method of the construction machine according to various embodiments of the present disclosure.

FIG. 5 is a flowchart showing a login method of the construction machine according to various embodiments of the present disclosure.

Referring to FIG. 5, the login method of the construction machine according to various embodiments of the present disclosure may include an operation of selecting a login method (S1), an operation of checking whether to use a start lock (S2), an operation of checking whether to match a previous user's smart key (S3), an operation of checking whether to recognize the smart key within a lock suspension time (S4), a previous user login operation (S5), a public user login operation (S6), an operation of checking whether to recognize the smart key (S7), an operation of display a login screen (S8), an operation of checking whether to match a password (S9), a specific user login operation (S10), an operation of counting the number of times of failure (S11), a password input lock operation (S12), an operation of checking whether a password lock time is exceeded (S13), an operation of acquiring a start authority (S14), an operation of changing operation information and settings (S15), and an operation of displaying user information (S16).

The operation of selecting the login method (S1) may include an operation of providing the user with a login selection screen that asks the user to select a login method from the user login device 360 and an operation of applying the login method selected by the user to the user login device 360.

When the first login method (e.g., a login method using only a smart key) is selected by the user in the operation of selecting the login method (S1), the operation of checking whether to use the start lock (S2) may be performed.

Meanwhile, when the second login method (e.g., a login method using a smart key or a password) is selected by the user in the operation of selecting the login method (S1), the operation of checking whether to recognize the smart key (S7) may be performed.

The operation of checking whether to use the start lock function (S2) may include an operation of checking whether the use of the start lock function has been selected by the user. In this case, the star lock function may be a function of applying the previous user's settings to the construction machine when the previous user logs in within the lock suspension time after the construction machine is turned off.

In the operation of checking whether to use the start lock (S2), when it is confirmed that the user does not use the start lock function (No), the public user login operation (S6) of identifying the user logging in using the smart key as the public user may be performed.

Meanwhile, in the operation of checking whether to use the start lock (S2), when it is confirmed that the user will use the start lock function (Yes), the operation of checking whether to match the previous user's smart key (S3), which determines whether the logged-in user's smart key is the same as the previous user's smart key, may be performed.

The operation of checking whether to match the previous user's smart key may include an operation of checking whether a smart key used by a user before the construction machine is turned off is the same as a smart key of a current user boarding the construction machine.

In the operation of checking whether to match the previous user's smart key (S3), when the smart key of the previous user (user before the construction machine is turned off) is the same as the smart key of the current user (current user boarding the construction machine) (Yes), the operation of checking whether to recognize the smart key within the lock suspension time (S4) may be performed.

Meanwhile, in the operation of checking whether to match the previous user's smart key (S3), when the previous user's smart key is not the same as the current user's smart key (No), the public user login operation (S6) of identifying the current user as the public user may be performed.

The operation of checking whether to recognize the smart key within the lock suspension time (S4) may include an operation of checking whether the smart key has been recognized within the lock suspension time after the construction machine is turned off. In this case, the lock suspension time is a time set by the user and may be set when the user selects whether to use the start lock.

In the operation of checking whether to recognize the smart key within the lock suspension time (S4), when the smart key is recognized within the lock suspension time (e.g., 10 minutes) (Yes), the previous user login operation (S5) of identifying the current user as the previous user may be performed.

Meanwhile, in the operation of checking whether to recognize the smart key within the lock suspension time (S4), when the smart key is not recognized after the lock suspension time is exceeded (No), the operation of displaying the login screen (S8) may be performed.

As described above, in the operation of selecting the login method (S1), when the second login method (login method using a smart key or a password) is selected (smart key or password), the operation of checking whether to recognize the smart key (S7) may be performed.

In the operation of checking whether to confirm the smart key (S7), when the user carries a smart key and boards a construction machine and the user's smart key is recognized (Yes), the operation of checking whether to use the start lock (S2) may be performed.

Meanwhile, in the operation of checking whether to recognize the smart key (S7), when the user boards the construction machine without a smart key and the user's smart key is not recognized (No), the operation of displaying the login screen (S8) may be performed.

The operation of displaying the login screen (S8) may include an operation of providing the user with the login screen on which a password may be input. In this case, the operation of displaying the login screen (S8) may include displaying the login screen on the display provided in the output device 350 by controlling the output device 350 from the user login device 360 through the processor 310, thereby providing the user with the login screen on which the password may be input as visual information.

The operation of checking whether to match the password (S9) may include an operation of checking whether there is a password matching the password input by the user among the stored passwords. In this case, the stored passwords may be stored in the storage device 330 or the user login device 360 by each user or an administrator.

In the operation of checking whether to match the password (S9), when there is a password matching the password input by the user among the stored passwords (Yes), the specific user login operation (S10) may be performed.

Meanwhile, in the operation of checking whether to match the password (S9), when there is no password matching the password input by the user among the stored passwords (No), the operation of counting the number of times of failure (S11) may be performed.

The operation of counting the number of times of failure (S11) may include an operation of counting the number of times the password input by the user does not match the stored passwords and an operation of checking whether the counting results exceed a preset number of times (e.g., 3 times).

In the operation of counting the number of times of failure (S11), when the number of times the password input by the user does not match the stored passwords is within the preset number of times (No), the operation of displaying the login screen (S8) may be performed.

Meanwhile, in the operation of counting the number of times of failure (S11), when the number of times the password input by the user does not match the stored passwords exceeds the preset number of times (Yes), the operation of checking whether the password lock time is exceeded (S13) may be performed.

The password input lock operation (S12) may include an operation of stopping the user's password input or blocking the password input by the user from being received by the user login device.

For example, the password input lock operation (S12) may include an operation of removing a password input screen from the login screen or blocking the password input from the input device by the user from being transmitted to the user login device.

The operation of checking whether the password lock time is exceeded (S13) may include an operation of checking whether the time for which the password input lock operation (S12) is performed exceeds a preset time (password input lock time, for example, 10 minutes).

In the operation of checking whether the password lock time is exceeded (S13), when an execution time of the password input lock operation (S12) does not exceed the preset time (e.g., 10 minutes) (Yes), the password input lock operation (S12) may be performed.

Meanwhile, in the operation of checking whether the password lock time is exceeded (S13), when the execution time of the password input lock operation (S12) exceeds the preset time (No), the operation of displaying the login screen (S8) may be performed.

As described above, when the current user is identified as the public user and the public user login operation (S6) is operated, identified as the previous user and the previous user login operation (S5) is performed, or identified as the specific user and the specific user login operation (S10) is performed, the operation of acquiring the start authority (S14) may be performed.

The operation of acquiring the start authority (S14) may include an operation of giving the authority for starting the construction machine to the user when the user boarding the construction machine is identified as a public user, a previous user, or a specific user. In this case, the construction machine may be started by manipulating a preset button such as a start button of the construction machine or a start button of the smart key. In this case, the user login device 360 may transmit a start possible command to the processor 310.

The operation of changing operation information and settings (S15) may perform an operation of changing, maintaining, or initializing the operation information and the settings of the construction machine according to each login operation identified as the public user, the previous user, and the specific user.

For example, the operation of changing operation information and settings (S15) may include an operation of initializing the operation information and the settings of the construction machine when the user is logged in as the public user.

In addition, the operation of changing operation information and settings (S15) may include an operation of maintaining the operation information and the settings of the construction machine before the construction machine is turned off when the user is logged in as the previous user.

In addition, the operation of changing operation information and settings (S15) may include an operation of receiving operation information and settings of the construction machine that correspond to the password input by the user from the storage device 330 when the user is logged in as the specific user and changing the operation information and the settings of the construction machine into the received information.

The operation of displaying the user information (S16) may include an operation of displaying user information on the display (display provided in the output device 350) provided in the construction machine. In this case, the user information may include operation information and settings of the construction machine for each user.

As described above, the user login device and login method according to various embodiments of the present disclosure can maintain the operation information and settings before the construction machine is turned off when the construction machine is started within the lock suspension time using the previous user's smart key even when the construction machine is turned off when the start lock function is activated, thereby increasing the user's use convenience.

Although the present disclosure has been described with reference to the embodiments illustrated in the drawings, these are merely illustrative, and those skilled in the art will understand that various modifications and other equivalent embodiments are possible therefrom. Therefore, the true technical scope of the present disclosure should be determined by the technical spirit of the appended claims.

The invention claimed is:

1. A construction machine comprising:

a storage device configured to store data;

a manipulation device configured to receive a command or data used to control an operation of the construction machine;

an output device configured to generate at least one of visual information, auditory information, and tactile information related to the operation of the construction machine;

a user login device configured to identify a current user of the construction machine as any one of a public user, a previous user, or a specific user based on usage of a password and a time point at which a smart key is used and apply the identified current user's settings to the construction machine, wherein the specific user is a user logged in using the password and whose setting and operation information are stored in the storage device, the previous user is a last user that used the construction machine, and the public user is a user which is not the specific user or the previous user; and a processor configured to control at least one of the user login device, the storage device, the manipulation device, and the output device, wherein the user login device identifies the current user of the construction machine as the previous user when the same smart key as a previous user's smart key is recognized within a lock suspension time after the construction machine is turned off in a state in which a start lock function is activated.

2. The construction machine of claim 1, wherein the user login device identifies the current user of the construction machine as the public user when at least one smart key recognized within the lock suspension time after the construction machine is turned off in a state in which the start lock function is activated is not the previous user's smart key, or when the at least one smart key is recognized after the lock suspension time is exceeded after the construction machine is turned off in the state in which the start lock function is activated.

3. The construction machine of claim 1, wherein the user login device identifies the current user of the construction machine as a public user when the at least one smart key is recognized in a state in which the start lock function is deactivated.

4. The construction machine of claim 1, wherein the user login device maintains the previous user's settings and operation information when the current user of the construction machine is identified as the previous user.

5. The construction machine of claim 1, wherein the user login device initializes the previous user's settings and the operation information when the current user of the construction machine is identified as the public user.

6. The construction machine of claim 1, wherein the user login device applies the specific user's settings and operation information that correspond to the password input by the specific user when the current user of the construction machine is identified as the specific user.

7. A construction machine comprising:

at least one smart key interworking with the construction machine;

a start lock device configured to set a lock suspension time based on an input of a previous user of the construction machine; and a user login device configured to:

identify a current user of the construction machine as any one of a public user, a previous user, or a specific user based on usage of a password and a time point at which the at least one smart key is used, and apply the identified current user's settings to the construction machine, wherein the specific user is a user logged in using the password and whose setting and operation information are stored in the storage device, the previous user is a last user that used the construction machine, and the public user is a user which is not the specific user or the previous user, and wherein the user login device identifies the current user of the construction machine as the previous user when the same smart key as a previous user's smart key is recognized within the lock suspension time after the construction machine is turned off in a state in which a start lock function is activated.

8. A user login method comprising:

identifying a current user of a construction machine as any one of a public user, a previous user, or a specific user based on usage of a password and a time point at which a smart key is used, wherein the specific user is a user logged in using the password and whose setting and operation information are stored in the storage device, the previous user is a last user that used the construction machine, and the public user is a user which is not the specific user or the previous user; and setting the construction machine based on the identified current user, wherein the identifying the current user of the construction machine includes identifying the current user of the construction machine as the previous user when the same smart key as a previous user's smart key is recognized within a lock suspension time after the construction machine is turned off in a state in which a start lock function is activated.

9. The user login method of claim 8, wherein the setting the construction machine includes setting the construction machine to maintain the previous user's settings and operation information when the current user of the construction machine is identified as the previous user.

10. The user login method of claim 8, wherein the identifying the current user of the construction machine includes identifying the current user of the construction machine as the public user when the at least one smart key is recognized in a state in which the start lock function is deactivated or a smart key different from the previous user's smart key is recognized in a state in which the start lock function is activated.

11. The user login method of claim 10, wherein the setting the construction machine includes setting the construction machine to initialize the previous user's settings and operation information when the current user of the construction machine is identified as the public user.

12. The user login method of claim 8, wherein the setting the construction machine includes setting the construction machine to change the settings and operation information of the construction machine into settings and operation information that correspond to the password input by the specific user when the current user of the construction machine is identified as the specific user.

* * * * *